(12) United States Patent
Jackson et al.

(10) Patent No.: US 8,249,853 B2
(45) Date of Patent: Aug. 21, 2012

(54) EXPOSING DEVICE FEATURES IN PARTITIONED ENVIRONMENT

(75) Inventors: Jeff Jackson, Newberg, OR (US); Rinat Rappoport, Haifa (IL); Sergei Gofman, Haifa (IL); Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1261 days.

(21) Appl. No.: 11/395,822

(22) Filed: Mar. 31, 2006

(65) Prior Publication Data

US 2007/0233775 A1 Oct. 4, 2007

(51) Int. Cl.
 *G06F 9/455* (2006.01)
(52) U.S. Cl. .......................... 703/24; 703/25
(58) Field of Classification Search .............. 703/24, 703/25
See application file for complete search history.

(56) References Cited

U.S. PATENT DOCUMENTS

| | | | |
|---|---|---|---|
| 6,247,109 B1 | 6/2001 | Kleinsorge et al. | |
| 6,633,916 B2 | 10/2003 | Kauffman | |
| 6,944,699 B1 | 9/2005 | Bugnion et al. | |
| 7,383,555 B2 * | 6/2008 | Billau et al. | 719/327 |
| 7,689,800 B2 * | 3/2010 | Oshins et al. | 711/173 |
| 2002/0143842 A1 | 10/2002 | Cota-Robles et al. | |
| 2003/0088710 A1 | 5/2003 | Sandhu et al. | |
| 2004/0068725 A1 | 4/2004 | Mathiske et al. | |
| 2005/0131668 A1 | 6/2005 | Traut | |
| 2005/0246453 A1 | 11/2005 | Erlingsson et al. | |

OTHER PUBLICATIONS

International Search Report and Written Opinion of the International Searching Authority Dated Nov. 12, 2007, International Application No. PCT/US2007/008006.
International Search Report and Written Opinion of the International Searching Authority Dated Feb. 22, 2008, International Application No. PCT/US2007/008006.
European Application No. 07774324.3-1229/2013726 PCT/US2007008006. Extended Supplementary European Search Report, Mailing Date May 14, 2012, 6 pages.

* cited by examiner

*Primary Examiner* — Hugh Jones
(74) *Attorney, Agent, or Firm* — Blakely, Sokoloff, Taylor & Zafman LLP

(57) ABSTRACT

An embodiment of the present invention is a technique to process an input/output (I/O) transaction. An emulated device driver in a guest partition interacts with a virtual machine (VM) manager in processing an input/output (I/O) transaction on behalf of an application via an operating system (OS). The I/O transaction is between the application and a device. A device emulator in a service partition communicatively coupled to the emulated device driver interacts with the VM manager in processing the I/O transaction on behalf of a device specific driver via the OS. The device specific driver interfaces to the device.

12 Claims, 8 Drawing Sheets

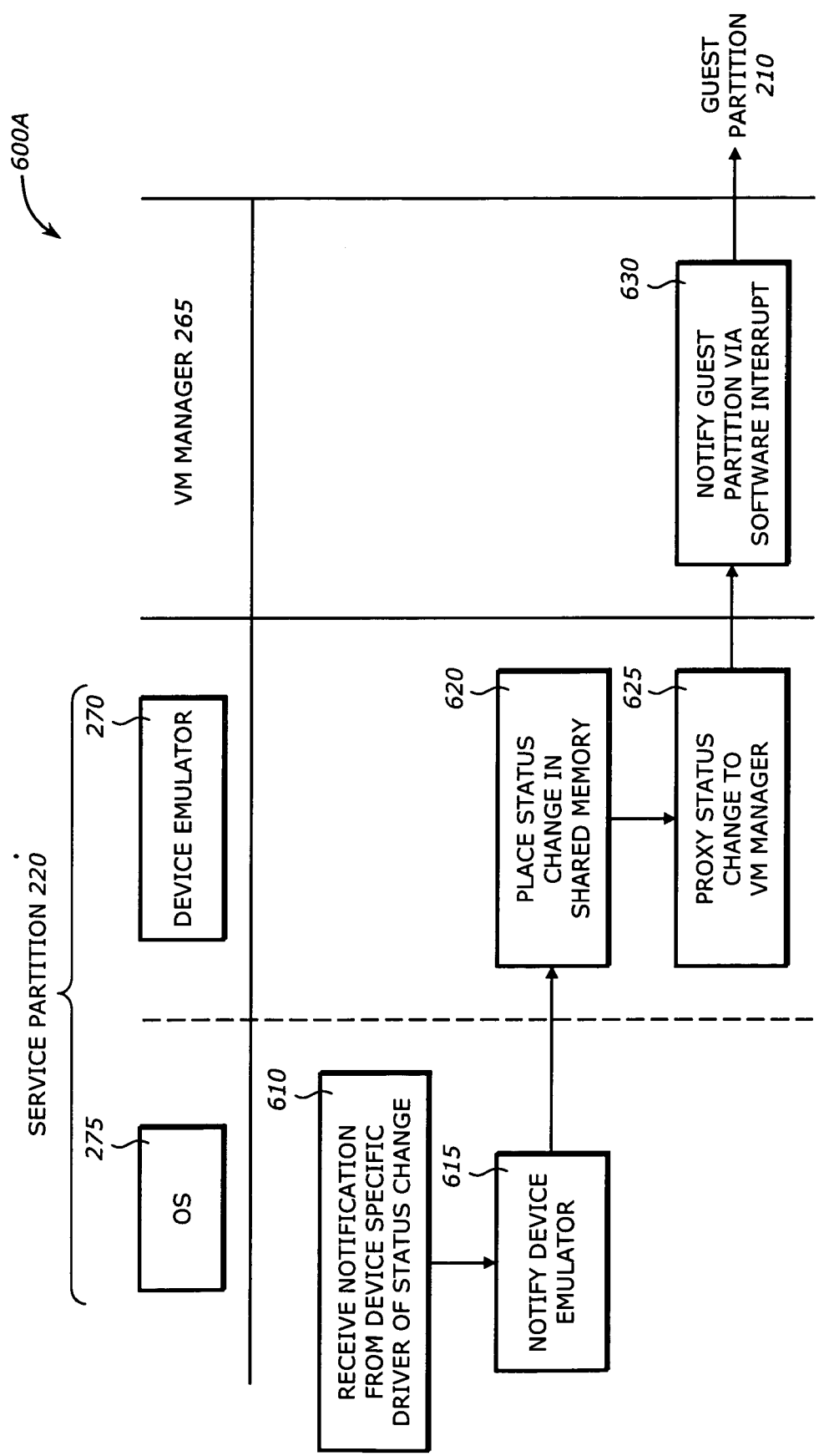

EXPOSING DEVICE FEATURES IN PARTITIONED ENVIRONMENT

BACKGROUND

1. Field of the Invention

Embodiments of the invention relate to the field of partitioning technology, and more specifically, to device drivers in a partitioned environment.

2. Description of Related Art

In partitioned environment (e.g., a virtualized environment), many instances of guest operating environments may be created. These guest environments or partitions may run independently of each other. Typically, a software layer, such as a hypervisor, runs directly on the system hardware and exposes the virtual platform to the guest partitions. Under this scheme, devices or hardware elements may be exposed to the guest partitions as models having some generic characteristics.

The software layer abstracts the underlying device features into a generic model that may be common to similar devices. One problem with this abstraction is that the particular or unique features of a device may not be fully utilized. In many applications, it may be desirable to access the device specific functionalities to utilize the value-added or unique features offered by the device.

BRIEF DESCRIPTION OF THE DRAWINGS

Embodiments of invention may best be understood by referring to the following description and accompanying drawings that are used to illustrate embodiments of the invention. In the drawings:

FIG. 6A is a diagram illustrating a flow of the first part of operations for a notification of status change from device to application according to one embodiment of the invention.

DESCRIPTION

Figure 1A:
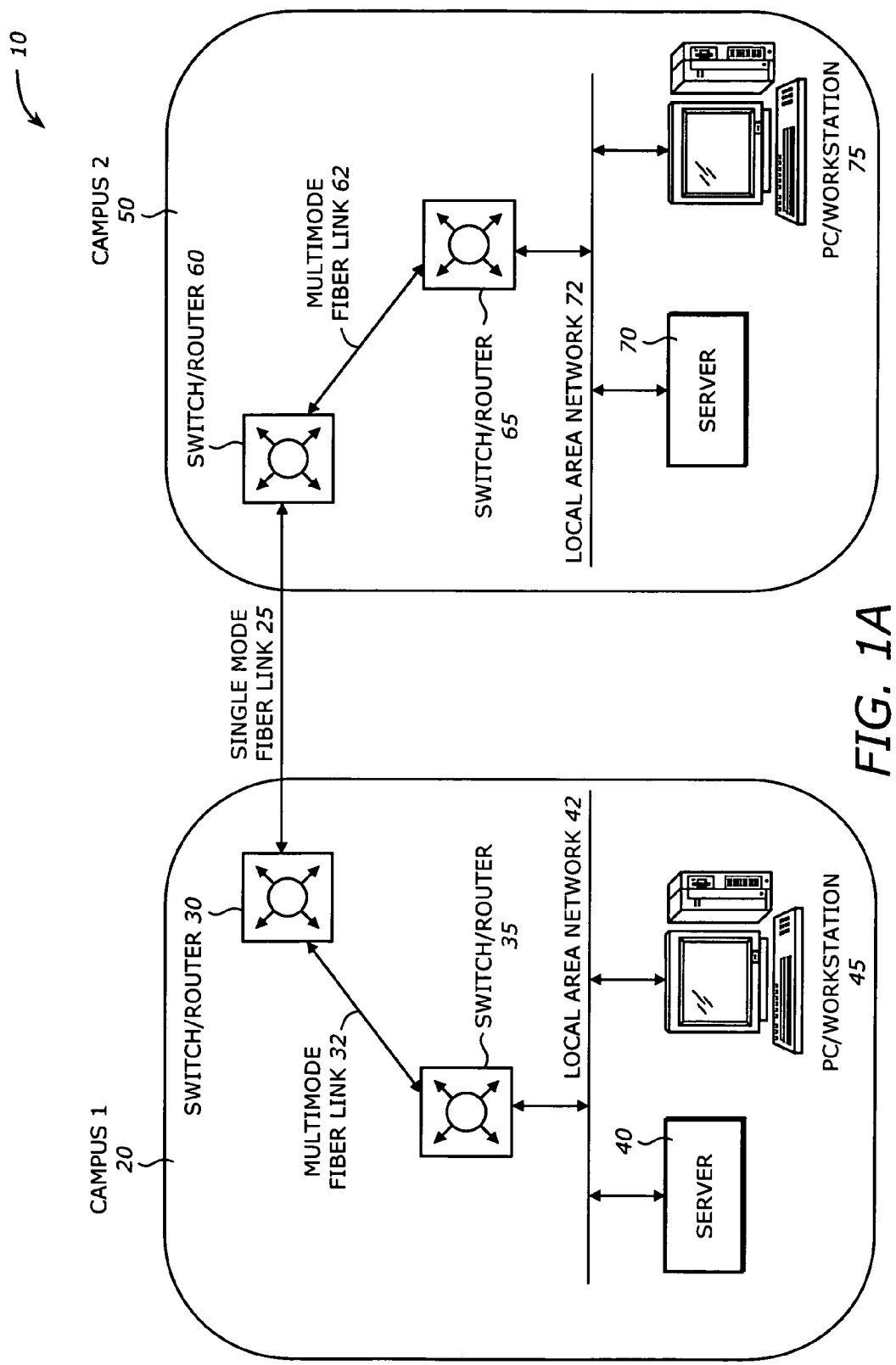
FIG. 1A is a diagram illustrating a network system in which one embodiment of the invention can be practiced.

An embodiment of the present invention is a technique to process an input/output (I/O) transaction. An emulated device driver in a guest partition interacts with a virtual machine (VM) manager in processing an I/O transaction on behalf of an application via an operating system (OS). The I/O transaction is between the application and a device. A device emulator in a service partition communicatively coupled to the emulated device driver interacts with the VM manager in processing the I/O transaction on behalf of a device specific driver via the OS. The device specific driver interfaces to the device.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

One embodiment of the invention is a technique to process I/O transactions between an application and an I/O device in a partitioned environment. The technique allows a generic emulated device to expose and service functionality that may be unique or special to the driver and hardware of the real device. This may be performed by proxying the standard driver I/O control interface from a guest partition to a service partition that owns or controls the real device hardware. With the I/O control proxying, all queries from the application to perform certain action, whether those are standard or custom, are passed directly to the standard device driver. The queries are opaque to the model that is created to represent the real hardware. Any custom commands that are specific to the device then may be honored by the device specific driver. The technique is not limited to strictly virtualization environments. It may be expanded to any environment in which a real device hardware is owned or controlled by one partition and an emulated device of the same class is presented to the other partitions. Any partitioned environment, whether created using virtualization or any other type of technology, may be employed.

FIG. 1A is a diagram illustrating a system 10 in which one embodiment of the invention can be practiced. The system 10 represents a Local Area Network (LAN) applications using 10 Gigabit Ethernet. The system 10 includes two campuses 20 and 50 and link 25.

Each of the campuses 20 and 50 represents an enterprise using network interconnections to link personal computers (PCs), workstations, and servers. They may have aggregation of multiple 1000BASE-X or 1000BASE-T segments into 10 Gigabit Ethernet downlinks. The link 25 may be a single mode fiber link that connects the two campuses 20 and 50 over a long distance (e.g., 40 km).

Campuses 20 and 50 may be similar in their infrastructure. The network in each campus may encompass buildings, data centers, or computer rooms. The campus 20 may include switches/routers, such as switch/router 30 and switch/router 35, and a LAN 42. The campus 50 may include switches/routers, such as switch/router 60 and switch/router 65, and a LAN 72. Switch/routers 30 and 60 are typically located at the edge of the corresponding campuses. They are connected together via the link 25. Switches/routers 30 and 35 are connected via a multimode fiber link 32 over shorter distances (e.g., 30-80 meters) at speed of up to 10 Gigabits per second (Gbps). The switch/router 35 is connected to the LAN 42. Similarly, switches/routers 60 and 65 are connected via a multimode fiber link 62 over shorter distances (e.g., 30-80 meters) at speed of up to 10 Gigabits per second (Gbps). The switch/router 65 is connected to the LAN 72.

The LAN 42 provides connectivity to servers, PCs, or workstations, such as a server 40 and a personal computer (PC)/workstation 45. Similarly, the LAN 72 provides network connectivity to servers, PCs, or workstations, such as a server 70 and a PC/workstation 75. The server 40 or 70 provides specific operations to support the computing environment. They may be a print server connected to a variety of printers, a storage server connected to mass storage devices such as tape drive, redundant arrays of inexpensive disks (RAIDs), a media server to provide multimedia services such as video, audio, or graphics, or any server with specific functions. Each server typically includes one or more network interface cards (NICs) with network connectivity to the corresponding LAN. The PC/workstation 45 or 75 may be a processing system running a virtualization platform environment.

Figure 1B:
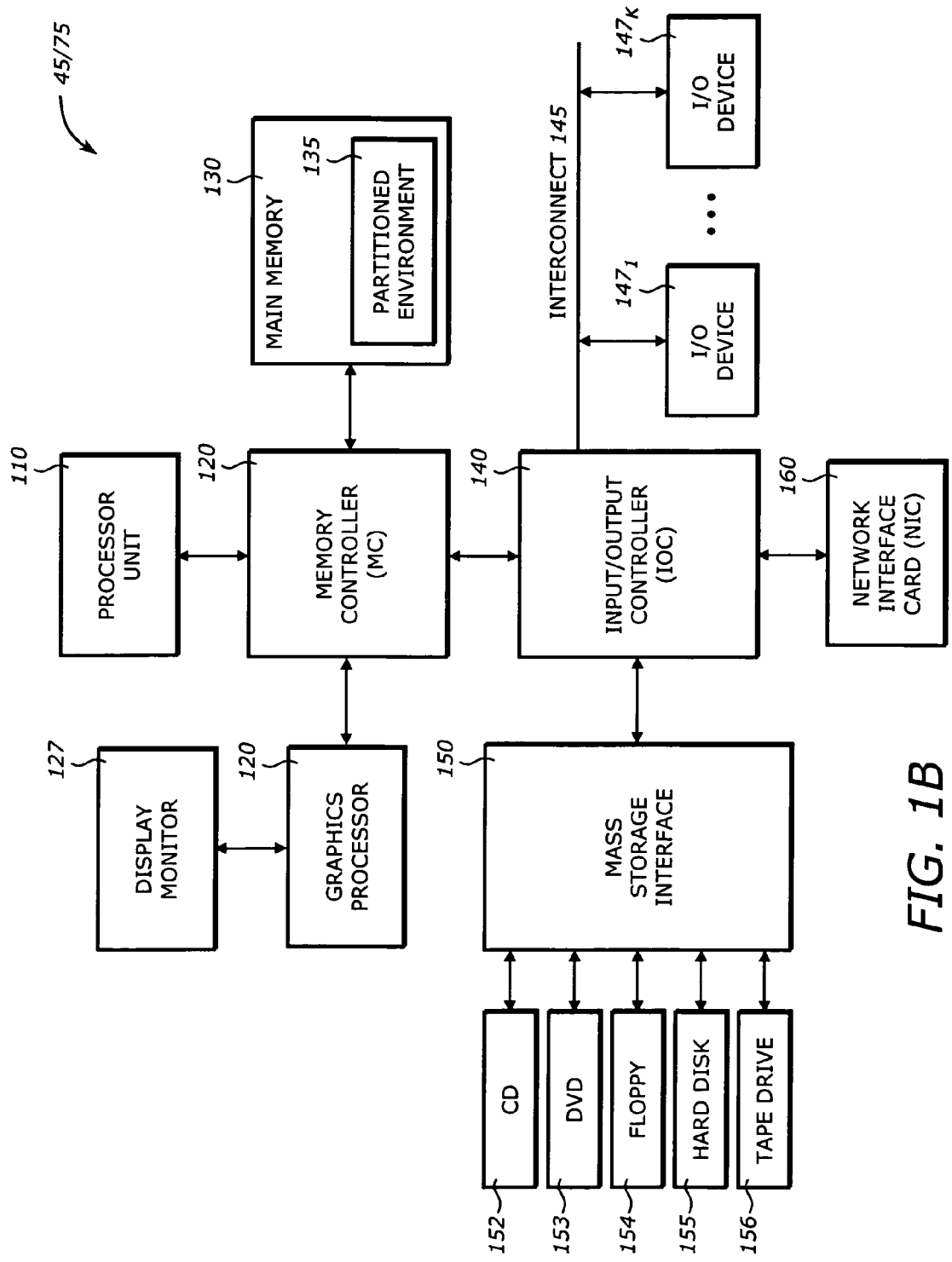
FIG. 1B is a diagram illustrating a processing system according to one embodiment of the invention.

FIG. 1B is a diagram illustrating the processing system 45/75 in which one embodiment of the invention can be practiced. The system 45/75 includes a processor unit 110, a memory controller (MC) 120, a main memory 130, a graphics processor 125, an input/output controller (IOC) 140, an interconnect 145, a mass storage interface 150, input/output (I/O) devices 147$_1$ to 147$_K$, and a network interface card (NIC) 160.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. The DRAMs may include Double Data Rate (DDR2) devices with a bandwidth of 8.5 Gigabyte per second (GB/s). In one embodiment, the memory 130 includes a partitioned environment 135. The partitioned environment 135 may support I/O transactions between an application and a device that expose the add-on or unique features of the device to the application. The partitioned environment 135 provides the creation of multiple VMs that may operate independently of one another.

The graphics processor 125 is any processor that provides graphics functionalities. The graphics processor 125 may also be integrated into the MC 120 to form a Graphics and Memory Controller (GMC). The graphics processor 125 may be a graphics card such as the Graphics Performance Accelerator (AGP) card, interfaced to the MC 120 via a graphics port such as the Accelerated Graphics Port (AGP) or a peripheral component interconnect (PCI) Express interconnect. The graphics processor 125 provides interface to the display monitor 127 such as standard progressive scan monitor, television (TV)-out device, and Transition Minimized Differential Signaling (TMDS) controller. The display monitor 127 may be any display device such as Cathode Ray Tube (CRT) monitor, TV set, Liquid Crystal Display (LCD), Flat Panel, and Digital CRT.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, and hard drive 155, tape drive 156, and any other magnetic or optic storage devices. The mass storage device provides a mechanism to read machine-accessible media.

The I/O devices 147$_1$ to 147$_K$ may include any I/O devices to perform I/O functions. Examples of I/O devices 147$_1$ to 147$_K$ include controller for input devices (e.g., keyboard, mouse, trackball, pointing device), media card (e.g., audio, video, graphic), network card, and any other peripheral controllers.

The NIC 160 provides network connectivity to the server 40/70. In one embodiment, the NIC 160 is compatible with both 32-bit and 64-bit peripheral component interconnect (PCI) bus standards. It is typically compliant with PCI local bus revision 2.2, PCI-X local bus revision 1.0, or PCI-Express standards. There may be more than one NIC 160 in the processing system. Typically, the NIC 160 supports standard Ethernet minimum and maximum frame sizes (64 to 1518 bytes), frame format, and Institute of Electronics and Electrical Engineers (IEEE) 802.2 Local Link Control (LLC) specifications. It may also support full-duplex Gigabit Ethernet interface, frame-based flow control, and other standards defining the physical layer and data link layer of wired Ethernet. It may support copper Gigabit Ethernet defined by IEEE 802.3ab or fiber-optic Gigabit Ethernet defined by IEEE 802.3z. The NIC 160 may be a wireless network adapter. It may be compliant with the PCI bus and Universal Serial BUS (USB) standards. It may cover up to 1000% the coverage and range of the IEEE 802.11g standard.

The NIC 160 may also be a host bus adapter (HBA) such as a Small System Small Interface (SCSI) host adapter or a Fiber Channel (FC) host adapter. The SCSI host adapter may contain hardware and firmware on board to execute SCSI transactions or an adapter Basic Input/Output System (BIOS) to boot from a SCSI device or configure the SCSI host adapter. The FC host adapter may be used to interface to a Fiber Channel bus. It may operate at high speed (e.g., 2 Gbps) with auto speed negotiation with 1 Gbps Fiber Channel Storage Area Network (SANs). It may be supported by appropriate firmware or software to provide discovery, reporting, and management of local and remote HBAs with both in-band FC or out-of-band Internet Protocol (IP) support. It may have frame level multiplexing and out of order frame reassembly, on-board context cache for fabric support, and end-to-end data protection with hardware parity and cyclic redundancy code (CRC) support.

Figure 2:
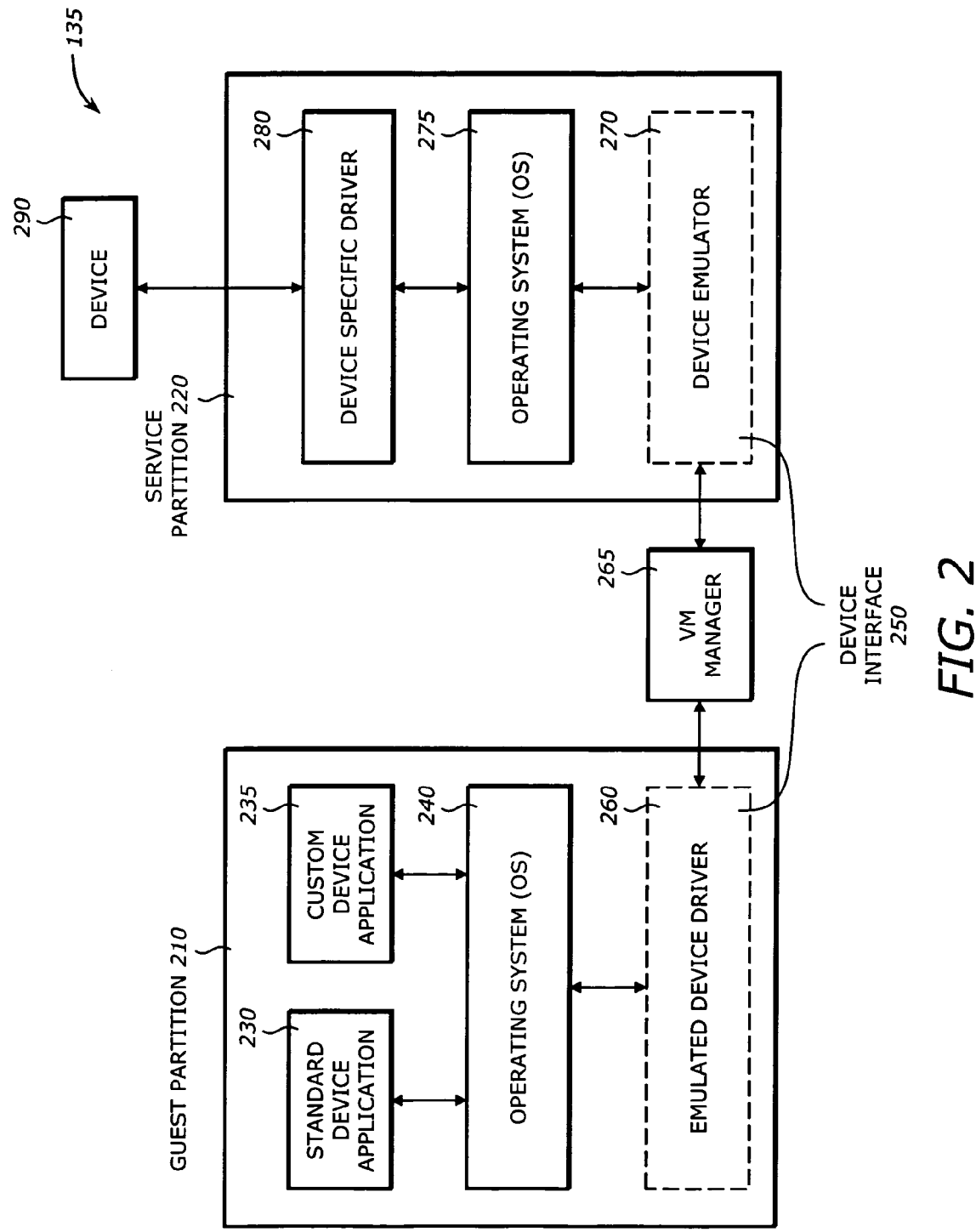
FIG. 2 is a diagram illustrating a partitioned environment according to one embodiment of the invention.

FIG. 2 is a diagram illustrating the partitioned environment 135 shown in FIG. 1 according to one embodiment of the invention. The partitioned environment 135 includes a guest partition 210, a VM manager 265, and a service partition 220. It may be partitioned using virtualization. Any one of components of the partitioned environment 135 may be implemented by software, firmware, hardware, or any combination thereof.

The guest partition 210 may be an instance of virtual partitions created on the platform or the processing system 45/75 to operate on physical hardware components. It may include a standard device application 230, a custom device application 235, a layer of operating system (OS) 240, and an emulated device driver 260. The standard device application 230 may be an application that uses a standard device. A standard device is a device that may be modeled as a generic device which has some minimal subset of features. The custom device application 235 may be an application that uses a custom interface device. A custom interface device may be a device that has add-on features that may be unique or special. These features may be useful to the application. It is therefore desirable to be able to access these unique or special features, rather than the generic or minimal features as in the standard device. The layer of OS 240 may include components of the OS that supports the guest partition 210. It may include standard application programming interface (API) function calls. The emulated device driver 260 may use these standard API calls to communicate with the application 230 or 235.

The emulated device driver 260 is a part of a device interface 250. The device interface 250 is coupled to the VM manager 265 to service a device 290. It may be implemented by software, firmware, hardware, or any combination thereof. The device interface 250 provides a mechanism to retain or expose the unique or special features of the device 290. These unique or special features are not masked out by the traditional techniques and are exposed to the application 235. The device interface 250 may be generic to work with different devices of the same class. Devices may be formed into classes with different characteristics and/or functionalities. For example, a network class may include all network adapters; a storage class may include all storage devices, etc. The emulated device driver 260 interacts with the VM manager 265 in processing an I/O transaction on behalf of the application 230 or 235 via the OS 240. The I/O transaction is between the application 230 or 235 and the device 290.

The VM manager 265 manages the VMs created on the platform. These include the guest partition 210 and the service partition 220. The VM manager 265 acts as a conduit to transfer information between the guest partition 210 and the service partition 220. It manages the VM interfacing tasks including sending notifications to the device interface 250.

The service partition 220 may include a device emulator 270, a layer of the OS 275, and a device specific driver 280. The device emulator 270 is a part of the device interface 250. It is communicatively coupled to the emulated device driver 260 and interacts with the VM manager 265 in processing the I/O transaction on behalf of the device specific driver 280 via the OS 275. The OS 275 may contain the components of the OS that are pertinent to the device drivers in the service partition 220. It may be the same as the OS 240. It may include standard application programming interface (API) function calls. The device emulator 270 may use these standard API calls to communicate with the device specific driver 280.

The device specific driver 280 interfaces to the device 290 and has the specific programs or routines in firmware or software to control or configure the device 290. The device 290 may be any I/O device that has add-on or special features that may be useful to the application 235. It may be the NIC 160 shown in FIG. 1.

Figure 3:
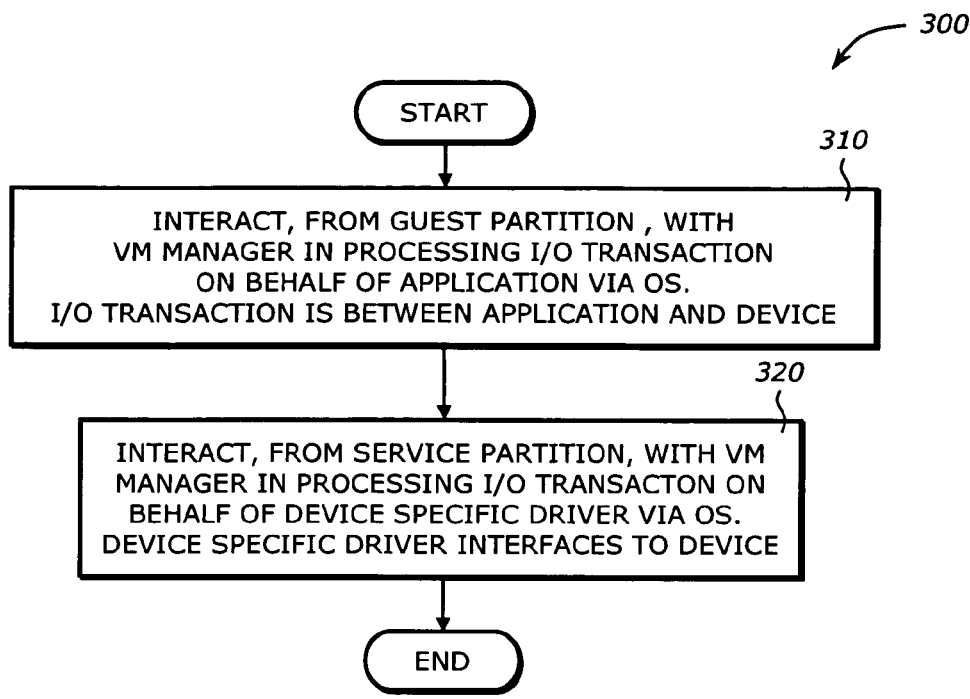
FIG. 3 is a flowchart illustrating a process to for device interface according to one embodiment of the invention.

FIG. 3 is a flowchart illustrating a process 300 for device interface according to one embodiment of the invention.

Upon START, the process 300 interacts from a guest partition with a VM manager in processing an I/O transaction on behalf of an application via an operating system (OS) (Block 310). The I/O transaction is between the application and an I/O device. The I/O transaction may be initiated from the application such as an I/O control (IOCTL) function call. An example of such an IOCTL call may be a request to a wireless network adapter to return a list of all the access points that are within the range as seen by the adapter. The I/O transaction may also be initiated from the I/O device such as an unsolicited notification. An example of such an unsolicited notification may be a status change (e.g., disconnected cable, down link status). The interaction with the VM manager from the guest partition is explained further in FIGS. 5A and 6B.

Next, the process 300 interacts from a service partition with the VM manager in processing the I/O transaction on behalf of a device specific driver via the OS (Block 320). The device specific driver interfaces to the device. It may contain specific functions or programs that set up, configure, or control the device. The interaction with the VM manager from the service partition is explained further in FIGS. 5B and 6A. Then, the process 300 is terminated.

Figure 4:
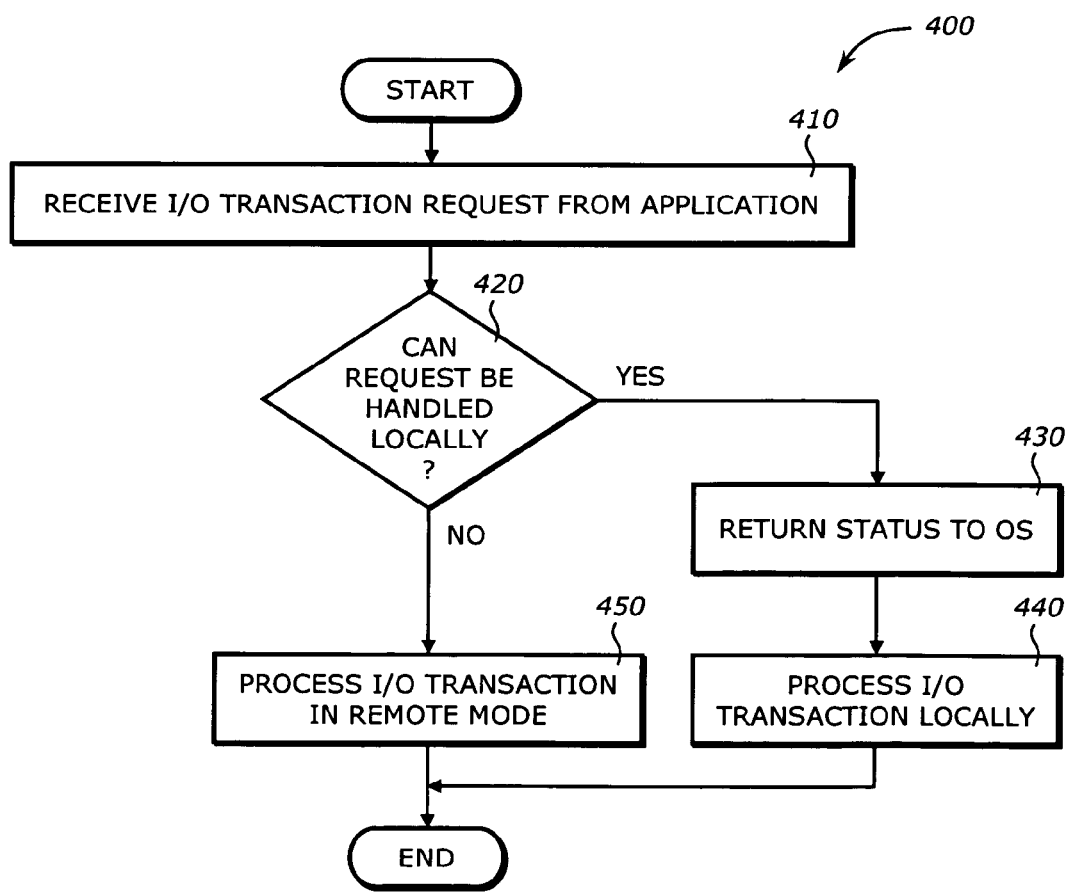
FIG. 4 is a flowchart illustrating a process to handle local transactions according to one embodiment of the invention.

FIG. 4 is a flowchart illustrating a process 400 to handle local transactions according to one embodiment of the invention.

Upon START, the process 400 receives an I/O transaction request from the application (Block 410). The I/O request may be intercepted by the OS component that interfaces directly to the application. Next, the process 400 determines if the I/O transaction request may be handled locally (Block 420). I/O transaction may be handled locally when the processing has been performed before and the result has been cached, e.g., stored in cache. For example, device name or link status may be cached. By caching the values or results of I/O transactions, the processing may be performed efficiently and fast.

If it is determined that the I/O transaction request may be handled locally, the process 400 returns a status to the OS (Block 430). The status may indicate that there is no need to wait for the operation because it may be completed within some pre-determined time period. Then, the process 300 processes the I/O transaction locally (Block 440). For example, the device name may be retrieved from the cache and returned to the requesting application. The process 400 is then terminated.

If it is determined that the I/O transaction request may not be handled locally, the process 400 proceeds to process the I/O transaction in the remote mode (Block 450). The processing in the remote mode is performed by the device interface 250 (FIG. 2) and is explained more fully in FIGS. 5A, 5B, 6A and 6B. The process 400 is then terminated.

Figure 5A:
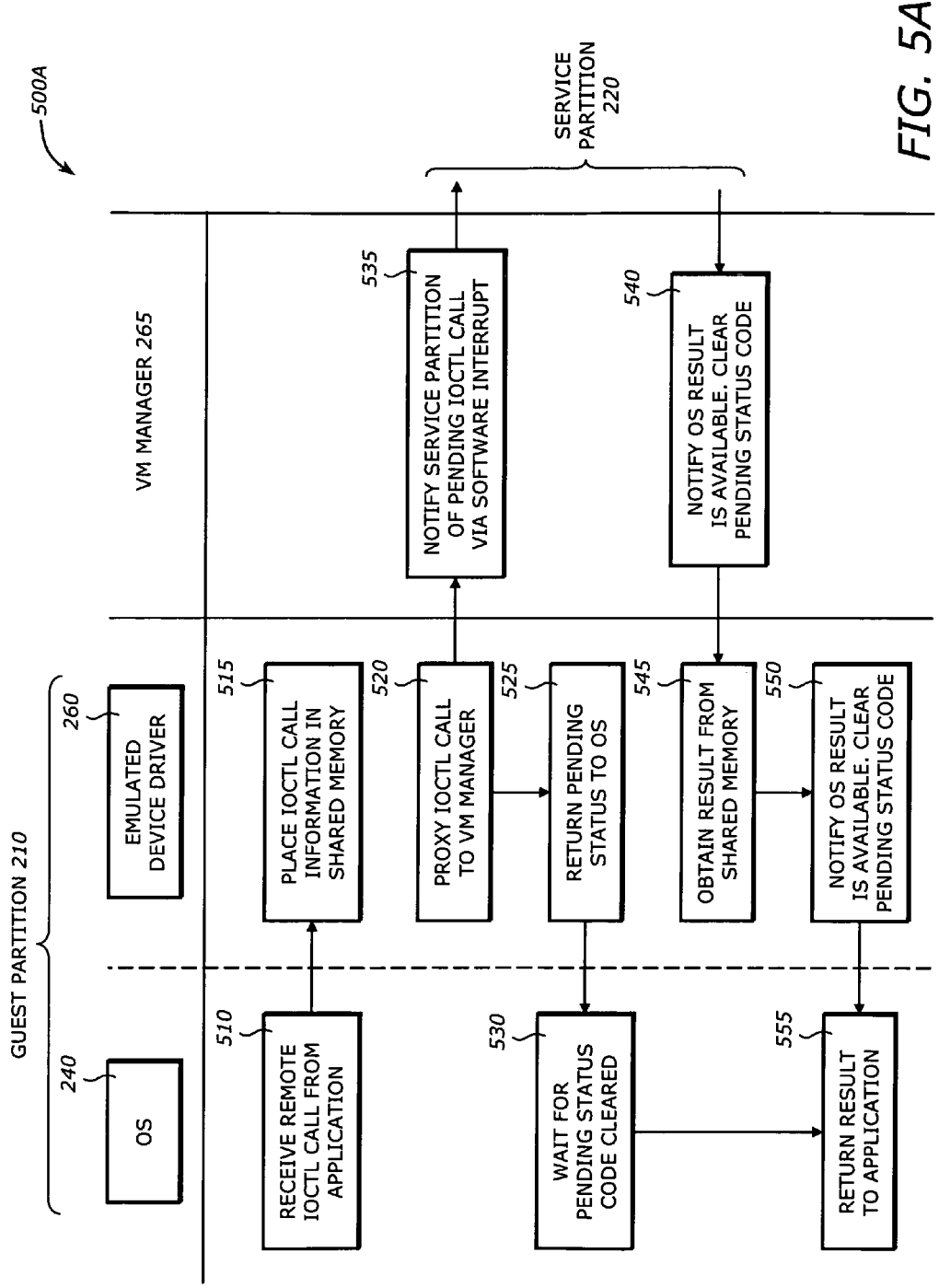
FIG. 5A is a diagram illustrating a flow of the first part of operations for an input/output control call from application to device according to one embodiment of the invention.

FIG. 5A is a diagram illustrating a flow 500A of the first part of operations for an input/output control call from application to device according to one embodiment of the invention. The flow 500A involves the guest partition 210 which includes the OS 240 and the emulated device driver 260, and the VM manager 265 as shown in FIG. 2. The emulated device driver 260 interacts with the VM manager 265 in processing the I/O transaction from the guest partition 210.

The flow 500A starts when the OS 240 in the guest partition 210 receives a remote I/O transaction request (e.g., IOCTL call) from the application (Block 510). The application may be the standard device application 230 or the custom device application 235 (FIG. 2). The OS 240 then passes the call to the emulated device driver 260. The emulated device driver 260 places the IOCTL call in a memory shared by the guest partition 210 and the service partition 220 (Block 515). This may involve obtaining the call information (e.g., command, arguments) and prepare the call information in a proper format for retrieval. The emulated device driver 260 then proxies the IOCTL call to the VM manager 265 (Block 520). This may involve making a call to the VM manager 265 to notify of the request. The emulated device driver 260 then returns a pending status to the OS 240 to indicate that an I/O transaction is pending (Block 525). This is to ensure that the process is compatible with some time limit provision of the OS 240. The OS 240 then waits for the pending status cleared (Block 530).

Figure 5B:
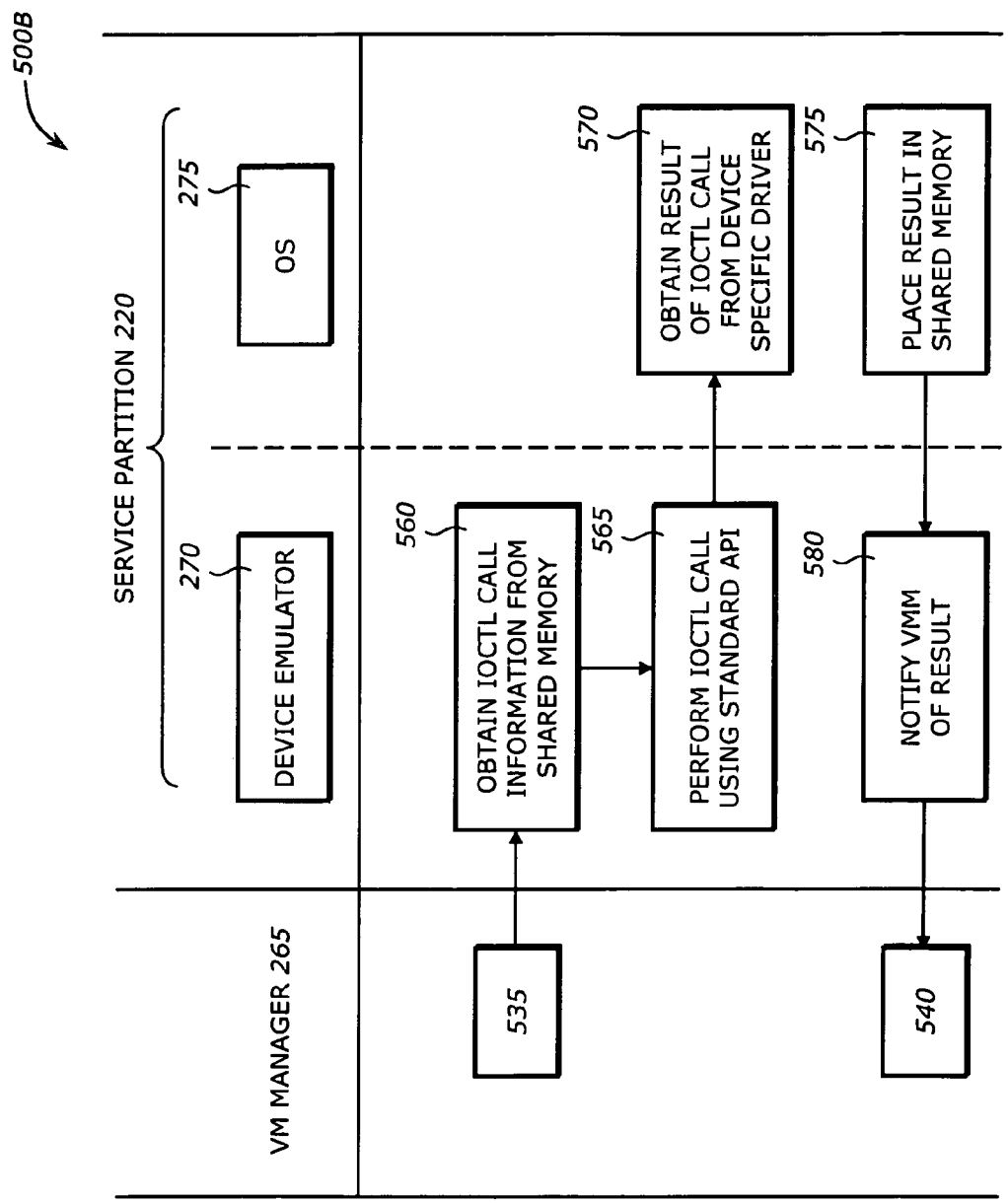
FIG. 5B is a diagram illustrating a flow of the second part of operations for an input/output control call from application to device according to one embodiment of the invention.

Upon receipt of the notification from the emulated device driver 260, the VM manager 265 notifies the service partition 220 of the pending I/O transaction (e.g., IOCTL call) (Block 535). This may be performed by sending a software interrupt followed by a resume operation, or any other notification to the service partition 220. The service partition 220 then proceeds with the processing as shown in FIG. 5B. Subsequently, the VM manager 265 receives a notification from the service partition 220 of the completion of the I/O transaction. It then notifies the guest partition of the result of the I/O transaction (Block 540). This may be performed by sending a software interrupt followed by a resume operation, or any other notification to the emulated device driver 260.

Upon receipt of the notification from the VM manager 265, the emulated device driver 260 obtains the result from the shared memory (Block 545). Then, it notifies the OS 240 that the result is available and clears the pending status (Block 550). Upon receipt of the cleared pending status, the OS 240 obtains the result and returns the result to the application (Block 555).

FIG. 5B is a diagram illustrating a flow 500B of the second part of operations for an input/output control call from application to device according to one embodiment of the invention. The flow 500B involves the service partition 220 which includes the OS 275 and the device emulator 270, and the VM manager 265 as shown in FIG. 2. The device emulator 270 interacts with the VM manager 265 in processing the I/O transaction from the service partition 220.

The flow 500B starts when the device emulator 270 receives a notification from the VM manager 265. The device emulator 270 obtains the IOCTL call information from the shared memory (Block 560). Then, it performs the IOCTL call using a standard API call to the OS 275 (Block 565). The OS 275 passes the IOCTL call to the device specific driver 280 (FIG. 2) which executes or sends the command to the device 290. Since the device specific driver 280 is specific to the device, it is able to access unique or add-on features of the device. Accordingly, these unique features may be made available or exposed to the requesting application. The device 290 then carries out the requested I/O transaction. Depending on the specific nature of the I/O transaction, it may return the result to the device specific driver 280 or update its status in the status register. The device specific driver 280 then obtains the result accordingly. The OS 275 then obtains the result of the I/O transaction from the device specific driver 280 (Block 570). It then places the result in a memory shared by the service partition 220 and the guest partition 210 (Block 575) and inform the device emulator 270. This may be the same shared memory that stores the I/O transaction information or a different shared memory. The device emulator 270 then notifies the VM manager 265 of the result (Block 580). The VM manager 265 then notifies the guest partition 210 as shown in Block 540 in FIG. 5A.

FIG. 6A is a diagram illustrating a flow 600A of the first part of operations for a notification of status change from device to application according to one embodiment of the invention. The flow 600A involves the service partition 220 which includes the OS 275 and the device emulator 270, and the VM manager 265. The device emulator 270 interacts with the VM manager 265 in processing the I/O transaction from the service partition 220.

The flow 600A starts when the OS 275 receives a notification from the device specific driver 280 (FIG. 2) of a status change (Block 610). The status change may be any change in the status of the device that may need attention. This may be caused by an event such as disconnected cable, down link status, etc. Then, the OS 275 notifies the device emulator 270 of the status change (Block 615). Upon receipt of the notification, the device emulator 270 places the status change information in a memory shared by the service partition 220 and the guest partition 210 (Block 620). It then proxies the status change notification to the VM manager 265 (Block 625). Upon receipt of the notification, the VM manager 265 notifies the guest partition 210 of the status change (Block 630). This may be performed by a software interrupt followed by a resume operation, or any other notification techniques.

Figure 6B:
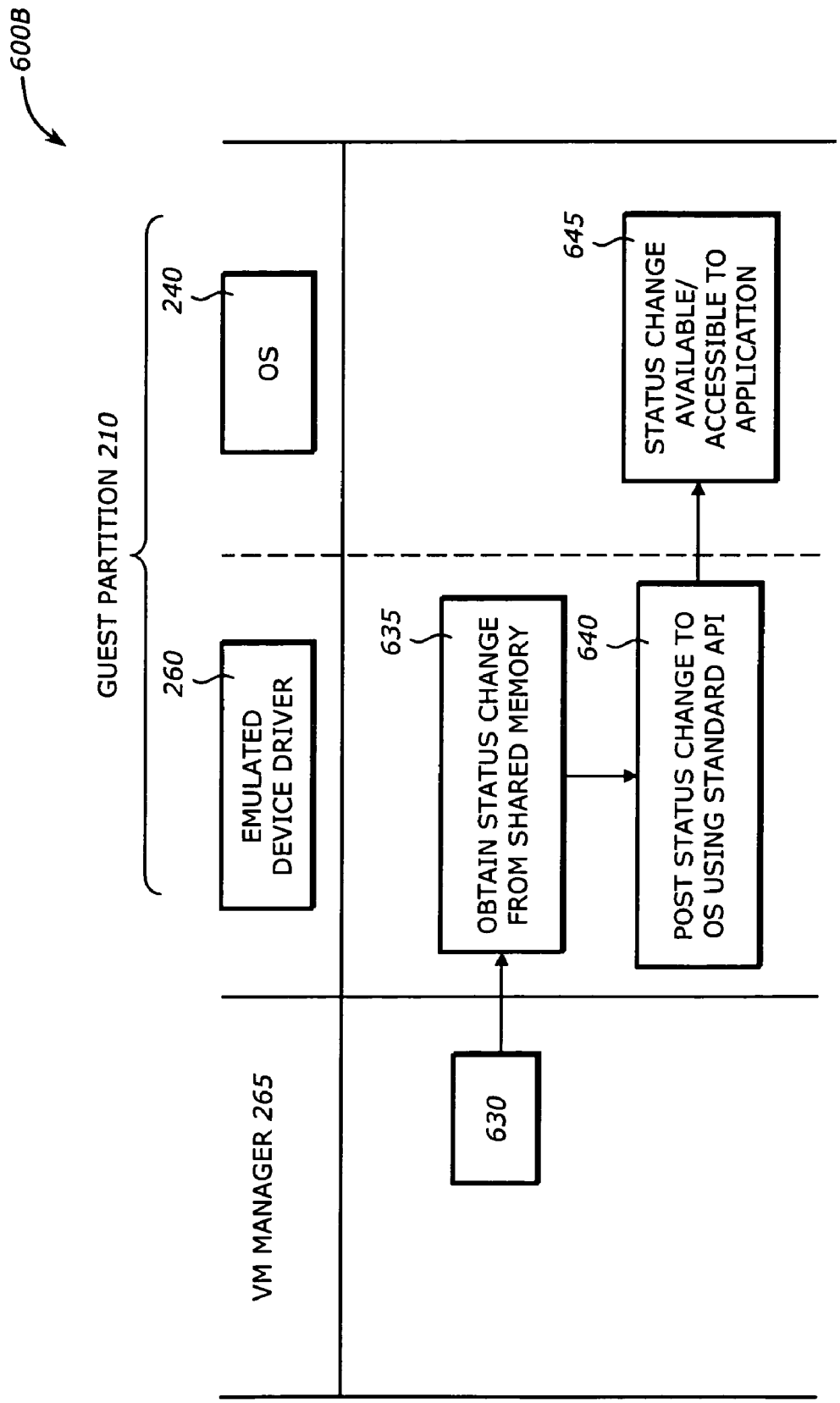
FIG. 6B is a diagram illustrating a flow of the second part of operations for a notification of status change from device to application according to one embodiment of the invention.

FIG. 6B is a diagram illustrating a flow 600B of the second part of operations for a notification of status change from device to application according to one embodiment of the invention. The flow 600B involves the guest partition 210 which includes the OS 240 and the emulated device driver 260, and the VM manager 265 as shown in FIG. 2. The emulated device driver 260 interacts with the VM manager 265 in processing the I/O transaction from the guest partition 210.

Upon receipt of the notification from the VM manager 265, the emulated device driver 260 obtains the status change information from the shared memory (Block 635). It then posts the status change to the OS 240 using a standard API call to the OS 240 (Block 640). The status change is now available and/or accessible to the application (Block 645).

Elements of embodiments of the invention may be implemented by hardware, firmware, software or any combination thereof. The term hardware generally refers to an element having a physical structure such as electronic, electromagnetic, optical, electro-optical, mechanical, electromechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a computing system having a partitioned environment including a guest partition and a service partition, wherein the guest partition having
    an emulated device driver to interact with a device emulator at the service partition to request one or more transactions to be performed by a device on behalf of one or more applications; and
    the device emulator at the service partition communicatively coupled to the emulated device driver to interact with the emulated device driver, wherein interaction by the device emulator includes transmitting, to the emulated device driver, a response relating to servicing of the one or more transactions by the device coupled to the service partition;
    wherein the one or more transactions comprise one or more input/output control transactions originating from the one or more applications to a virtual machine (VM) manager over a device interface coupling the emulated device driver and the device emulator, wherein the VM manager notifies the device emulator of the one or more transactions.

2. The apparatus of claim 1 wherein the emulated device driver places
    the one or more transactions in a shared memory between the guest partition and the service partition.

3. The apparatus of claim 2 wherein the device emulator is further to obtain the one or more transactions from the shared memory upon receiving a notification from the VM manager; and submit the one or more transactions to the device for processing.

4. A method comprising:
    interacting from an emulated device driver at a guest partition of a partitioned environment at a computing system on behalf of one or more applications at the guest partition, wherein interacting includes requesting one or more transactions to be performed by a device on behalf of the one or more applications; and
    interacting from a device emulator at a service partition of the partitioned environment, wherein interaction includes transmitting, to the emulated device driver, a response relating to servicing of the one or more transactions by the device coupled to the service partition;
    wherein the one or more transactions comprise: one or more input/output transactions originating from the one or more applications to a virtual machine (VM) manager over a device interface coupling the emulated device driver and the device emulator, wherein the VM manager notifies the device emulator of the one or more transactions.

5. The method of claim 4 wherein interacting from the emulated device driver at the guest partition further comprises: placing the one more transactions in a shared memory between the guest partition and the service partition.

6. The method of claim 5 wherein interacting from the device emulator at the service partition comprises:
    obtaining the one or more transactions from the shared memory upon receiving a notification from the VM manager; and submitting the one or more transactions to the device for processing.

7. A system comprising:

a computing system having a memory to store instructions, and a processing device to execute the instructions, wherein the instructions cause the processing device to:

facilitate an emulated device driver in a guest partition of a partitioned environment of the computing system to interact with a device emulator at the service partition to request one or more transactions to be performed by a device on behalf of one or more applications; and facilitate the device emulator in the service partition communicatively coupled to the emulated device driver to interact with the emulated device driver, wherein interaction by the device emulator includes transmitting, to the emulated device driver, a response relating to servicing of the one or more transactions by the device coupled to the service partition;

wherein the one or more transactions comprise one or more input/output transactions originating from the application to a virtual machine (VM) manager over a device interface coupling the emulated device driver and the device emulator, wherein the VM manager notifies the device emulator of the one or more transactions.

8. The system of claim 7 wherein the emulated device driver places the one or more transactions in a shared memory between the guest partition and the service partition.

9. The system of claim 8 wherein the device emulator is further to obtain the one or more transactions from the shared memory upon receiving a notification from the VM manager; and submitting the one or more transactions to the device for processing.

10. A non-transitory machine-accessible medium including data that, when accessed by a machine, cause the machine to:

interacting from an emulated device driver at a guest partition of a partitioned environment at a computing system on behalf of one or more applications at the guest partition, wherein interacting includes requesting one or more transactions to be performed by a device on behalf of the one or more applications; and interacting from a device emulator at a service partition of the partitioned environment, wherein interaction includes transmitting, to the emulated device driver, a response relating to servicing of the one or more transactions by the device coupled to the service partition;

wherein the one or more transactions comprise one or more input/output transactions originating from the one or more applications to a virtual machine (VM) manager over a device interface coupling the emulated device driver and the device emulator, wherein the VM manager notifies the device emulator of the one or more transactions.

11. The article of manufacture of claim 10 wherein the machine is further to perform operations comprising:
placing the one more transactions in a shared memory between the guest partition and the service partition.

12. The article of manufacture of claim 11 wherein the machine is further to perform operations comprising:
obtaining the one or more transactions from the shared memory upon receiving a notification from the VM manager; and submitting the one or more transactions to the device for processing.

* * * * *